US011544987B2

(12) United States Patent
Recine

(10) Patent No.: US 11,544,987 B2
(45) Date of Patent: Jan. 3, 2023

(54) AUTOMATED TILL REGISTER SYSTEM AND METHOD

(71) Applicant: Thomas Recine, Las Vegas, NV (US)

(72) Inventor: Thomas Recine, Las Vegas, NV (US)

( * ) Notice: Subject to any disclaimer, the term of this patent is extended or adjusted under 35 U.S.C. 154(b) by 0 days.

(21) Appl. No.: 16/999,669

(22) Filed: Aug. 21, 2020

(65) Prior Publication Data

US 2021/0056795 A1 Feb. 25, 2021

Related U.S. Application Data

(60) Provisional application No. 62/890,516, filed on Aug. 22, 2019.

(51) Int. Cl.
*G07F 19/00* (2006.01)
*G07D 11/34* (2019.01)
*G07G 1/00* (2006.01)
*G06Q 20/20* (2012.01)

(52) U.S. Cl.
CPC ........... *G07D 11/34* (2019.01); *G06Q 20/202* (2013.01); *G06Q 20/204* (2013.01); *G07G 1/0027* (2013.01)

(58) Field of Classification Search
CPC .... G06Q 20/202; G06Q 20/204; G07D 11/34; G07G 1/0027
USPC ........................................ 235/379, 380, 383
See application file for complete search history.

(56) References Cited

U.S. PATENT DOCUMENTS

| | | | | | |
|---|---|---|---|---|---|
| 5,313,050 | A | * | 5/1994 | Hiroki | G07D 11/12 235/379 |
| 5,804,804 | A | * | 9/1998 | Fukatsu | G07F 19/20 235/379 |
| 8,640,945 | B1 | * | 2/2014 | McCormick | G07D 11/24 235/379 |
| 9,141,876 | B1 | * | 9/2015 | Jones | G06K 9/00442 |
| 2005/0096986 | A1 | * | 5/2005 | Taylor | G06Q 40/02 705/16 |
| 2006/0065717 | A1 | * | 3/2006 | Hurwitz | G06Q 20/023 235/381 |
| 2010/0127070 | A1 | * | 5/2010 | Sanders | G07F 19/20 235/379 |
| 2018/0247289 | A1 | * | 8/2018 | Richelson | G07G 1/0009 |

(Continued)

FOREIGN PATENT DOCUMENTS

| | | | | | |
|---|---|---|---|---|---|
| EP | 2372664 | * | 5/2011 | | G07D 11/00 |
| GB | 2411035 | * | 2/2004 | | G07G 1/12 |

*Primary Examiner* — Daniel St Cyr
(74) *Attorney, Agent, or Firm* — The Thornton Firm, LLC

(57) ABSTRACT

An automated till register system that includes at least one processor, at least one Point of Sale (POS) system and interface, two cash recycler machines and one coin recycler machine arranged in a twin opposite configuration, the cash recycler machines oriented on opposite sides of one another, one on a cashier side and one on a customer side with a coin recycler located in the middle of the system between both cash recyclers. The system being networkable and having memory to perform executable instructions involving both cash and cashless transactions over a POS network thereby eliminating the need for a cash drawer and minimizing the handling of cash at every phase of the transactional process. Methods of use are implemented to eliminate cash drawer systems and minimize cash handling at all steps of the transactional process.

20 Claims, 9 Drawing Sheets

(56) References Cited

U.S. PATENT DOCUMENTS

2018/0300703 A1* 10/2018 Hiramatsu ........... G07G 1/0027
2019/0361651 A1* 11/2019 Wang .................... G06F 3/1296

* cited by examiner

AUTOMATED TILL REGISTER SYSTEM AND METHOD

CROSS-REFERENCE TO RELATED APPLICATIONS

The present utility patent application claims priority benefit of the U.S. provisional application for patent Ser. No. 62/890,516 titled "CASH MACHINE INTEGRATION WITHIN A POINT-OF-SALE SYSTEM" filed on Aug. 22, 2019 under 35 U.S.C. 119(e). The contents of this related provisional application are incorporated herein by reference for all purposes to the extent that such subject matter is not inconsistent herewith or limiting hereof.

RELATED CO-PENDING U.S. PATENT APPLICATIONS

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

BACKGROUND OF THE INVENTION

1. Field of the Invention

The invention relates generally to the field of cash machine systems. More specifically, the present invention relates to an improved software and/or hardware based control and integration of a machine to receive cash within a point-of-sale (POS) system.

2. Description of the Related Art

Cash register systems are known in the art. A cash register or till is a mechanical and/or electronic device for registering and calculating transactions at a point of sale. A typical cash register system consists of an apparatus to enter, record and calculate transactions and a cash drawer to store and tender change for those transactions.

Today, many cash registers are, and function as, individual computers. Newer register systems integrate modern technologies such as touch screens and near field communication (NFC) technology. Such register systems are connected to computerized point of sale networks using various types of both wired and wireless networking protocols. Such systems may be accessed remotely for the purpose of obtaining records or troubleshooting. Many businesses also use tablet computers as cash registers, utilizing the sale system as downloadable software application A cash drawer is usually a compartment underneath a cash register in which the cash from transactions is kept. The drawer typically contains a removable till. The till is usually a plastic or wooden tray divided into compartments used to store each denomination of bank notes and coins separately in order to make counting easier. The removable till allows money to be removed from the sales floor to a more secure location for counting and creating bank deposits. Some modern cash drawers are individual units separate from the rest of the cash register.

A cash drawer is typically of strong construction and may be integrated with the register or as a separate piece that the register sits atop. A cash drawer may slide in and out of its lockable box and is secured by a spring-loaded catch. When a transaction that involves cash is completed, the register sends an electrical impulse to a solenoid to release the catch and open the drawer. Cash drawers that are integral to a stand-alone register often have a manual release catch underneath to open the drawer in the event of a power failure. More advanced cash drawers have eliminated the manual release in favor of a cylinder lock, requiring a key to manually open the drawer. The cylinder lock usually has several positions: locked, unlocked, online (will open if an impulse is given), and release. The release position is an intermittent position with a spring to push the cylinder back to the unlocked position. In the "locked" position, the drawer will remain latched even when an electric impulse is sent to the solenoid.

Due to the increasing number of currency notes and varieties of notes, many newer cash drawers are designed to store notes upright & facing forward, instead of the traditional flat & facing upright position. This enables faster access to each note and allows more varieties of notes to be stored. Sometimes the cashier will even divide the notes without any physical divider at all. Some cash drawers are flip top in design, where they flip open instead of sliding out like an ordinary drawer, resembling a cashbox instead. Regardless of design, though, handling cash notes can be a difficult and risky endeavor.

Businesses typically store cash and currency notes in a lockable cash receptacle when not in use or before depositing at a financial institution. Cash boxes, safes or other receptacles have been used for over a century. While cash boxes and locked cash receptacles may provide a safe location to temporarily store cash, theft by workers remains a large problem. In the restaurant industry, statistics report that 75% to 85% of all restaurant theft is committed by employees, accounting for up to $6 million in annual losses.

The advent of modern POS (point of sale) systems has allowed businesses to track inventories, manage cash flow, analyze sales and even record tips for servers. A POS system is capable of tracking and recording all transactions and generally requires workers to obtain permission from a manager before altering a bill. Such POS systems have reduced the potential for fraud and theft. However, workers continuously find ways to steal money in spite of technological advances and employee theft remains problematic.

The use of cash recycler machines in retail settings is very new to the marketplace. Originally, cash recycler and coin recycler machines were limited to use at financial institutions. Today, the use of cash recycler and coin recycler machines in retail settings has become increasingly prevalent. However, cash recycler and coin recycler machines have not been successfully implemented in environments which traditionally require a cashier or clerk operating a traditional cash register and cash drawer.

Because modern POS systems are capable of tracking tips and cash transactions, it is desirable to provide a system and method capable of not only handling cash transactions, but to safely store cash funds. Additionally, it is desirable to provide a fast and secure payment system for businesses who deal largely in cash transactions. It is further desirable to provide a system and method capable of processing transactions which include cash gratuities and providing a secure means of paying employees their earnings either after a shift or at a later date.

Based on the foregoing, it is overwhelmingly clear that there exists a need for an improved automated till register system that integrates point of sale (POS) systems, cash recyclers, coin recyclers, employee payment systems, and business security systems.

SUMMARY

The object of the present invention is to minimize cash handling by employees or other personnel. The invention provides an improved automated till register system that integrates point of sale (POS) systems, cash recyclers, coin recyclers, employee payment systems, and business security systems. The present invention is directed towards an automated till register system which can be implemented anywhere secure cash transactions are desired. The automated till register system employs a twin opposite configuration of cash recycler machines which share a common secure receptacle. The twin opposite configuration allows for a cashier side and a customer side where transactions can be processed by customers and employees alike from either side.

A further object of the invention is to eliminate the need for an accessible cash drawer. The present invention eliminates the need for an accessible cash drawer through the use of one or more cash recyclers which may be granted limited access by trusted employees, management, and customers alike. Cash is securely stored in a locked cash repository or receptacle where access is limited to authorized personnel only. The invention is further networked with security systems such as video surveillance and fingerprint/eye scanners to prevent unauthorized access. The automated till register system can be configured to provide alerts when items are removed or split from POS tickets as well as report longer than normal check run time in order to prevent fraud. The elimination of cash drawer systems not only disincentivizes theft by employees but minimizes risk of robbery as well.

An additional object of the invention is to improve both productivity and operational efficiency in any given phase of a transactional environment. An automated till register system will reduce labor costs and other cash handling costs while simultaneously increasing security and maximizing available cash inventory. Such a system will eliminate cash handling while being able to make exact change for a given transaction. An automated till register system can eliminate petty cash banks and petty cash accounting. Such a system and method will enable businesses to grow and adapt their services to meet ever increasing and evolving customer demands.

Another object of the invention is to provide an effective payout means for employees or other personnel who receive income from tips or other gratuities. Depending on how an establishment distributes tips, tips which may be owed only to the employee who served the customer or distributed among a plurality of employees (e.g., who were responsible for the customer's service). Regardless of the distribution scheme, the automated till register system may receive cash tips and dispense an employee's tips to the employee at the end of the employee's shift or any other appropriate time. The automated till register system is capable of providing an accurate record of gratuities for employee tax purposes as well. Because gratuities are processed with the automated till register system, employees will no longer have to bring cash to work to make change when they do receive gratuities. In addition to being able to process transactions including gratuities, the invention prevents a phenomenon none as "note starvation" in cash recycler machines by enabling businesses to pay out tips and other gratuities electronically.

A final object of the invention is to provide an automated workflow model for retail and hospitality businesses alike. Such an invention eliminates the need for manual cash counts, manual reconciliation with Point of Sale (POS) systems, manual stocking of cash drawers, manual payout of tips and other gratuities and preparing deposits for delivery to financial institutions.

The invention is directed to an automated till register system, comprising at least one processor, at least one Point of Sale (POS) system and interface, two cash recycler machines and one coin recycler machine, the said cash recycler machines oriented on opposite sides of one another, one on the cashier side and one on the customer side with the coin recycler located in the middle of the system between both cash recyclers; and memory storing computer readable instructions that, when executed by the at least one processor, cause the automated till register system by at least one hardware processor in each cash recycler machine comprising a locked cash repository, a cash receptacle that receives cash and stores the cash in the cash repository, and a cash dispenser that dispenses cash from the cash repository, for each of a plurality of transactions determine an amount of cash received, via the cash receptacle, for the transaction, validate the received cash, and transmit a cash-payment notification to a point-of-sale (POS) server over at least one network, wherein the cash-payment notification indicates the amount of cash and a transaction identifier that identifies the transaction; by at least one hardware processor of the POS server, receive the cash-payment notification from the cash machine over the at least one network, if the amount of cash indicated in the cash-payment notification is sufficient to satisfy payment for the transaction identified in the cash-payment notification, determine whether or not change is due for the transaction, when determining that change is due, transmit a change notification to the cash machine over the at least one network, wherein the change notification indicates an amount of the change due for the transaction, and automatically close the transaction; and by the at least one hardware processor of the cash machine, when a change notification is transmitted by the POS server, receive the change notification from the POS server over the at least one network, and dispense the amount of the change that is indicated in the change notification via the cash dispenser.

In addition to cash payments, the automated till register system can be configured to accept payments by magnetic strip credit cards, RFID chip credit cards, Near Field Communication (NFC), mobile wallet, contactless and contact free means. The automated till register system can be configured to read bar codes for various transactions as well. Such an automated till register may be configurable to accept novel payment methods yet to be implemented.

The automated till register system can be implemented as machine readable instructions detailing a method for operating an automated till register system comprising the steps of entering and allowing transactions at a plurality of point of sale devices; communicating information regarding the transactions from the said point of sale devices to at least one automated till register system, the transactions including cash and non-cash payments; using the information in order to identify an expected count; moving transaction-related materials from the point of sale devices to said at least one automated till register system; counting, by a processor, at least some of said transaction-related materials in order to identify an actual count; comparing, by the processor, the actual count to the expected count; communicating the actual count and the expected count to an accounting system; and networking a plurality of cash and coin recycler devices to act together as a combined unit.

The automated till register system can be readily implemented across a wide variety of forms and configurations. Such forms and configurations are largely directed to a dual opposite configuration providing a cashier side and a customer side. However, configurations may include a mobile unit capable of moving through a business location so as to provide convenient access for customers and employees alike. Additionally, the present invention can be readily implemented across a wide variety of mobile technologies such as, but not limited to, smartphone and tablet applications. Moreover, applications of the invention can be readily implemented in software, which can be stored on a readable medium (i.e. hard disk, cloud storage, CD-ROM, flash memory, etc.) and used with a computer system either as a stand-alone application or over a network and/or client-server system.

BRIEF DESCRIPTION OF THE DRAWINGS

The invention directed by way of example, and not by way of limitation, in the figures of the accompanying drawings and in which like reference numerals refer to similar elements and in which.

Figure 1:
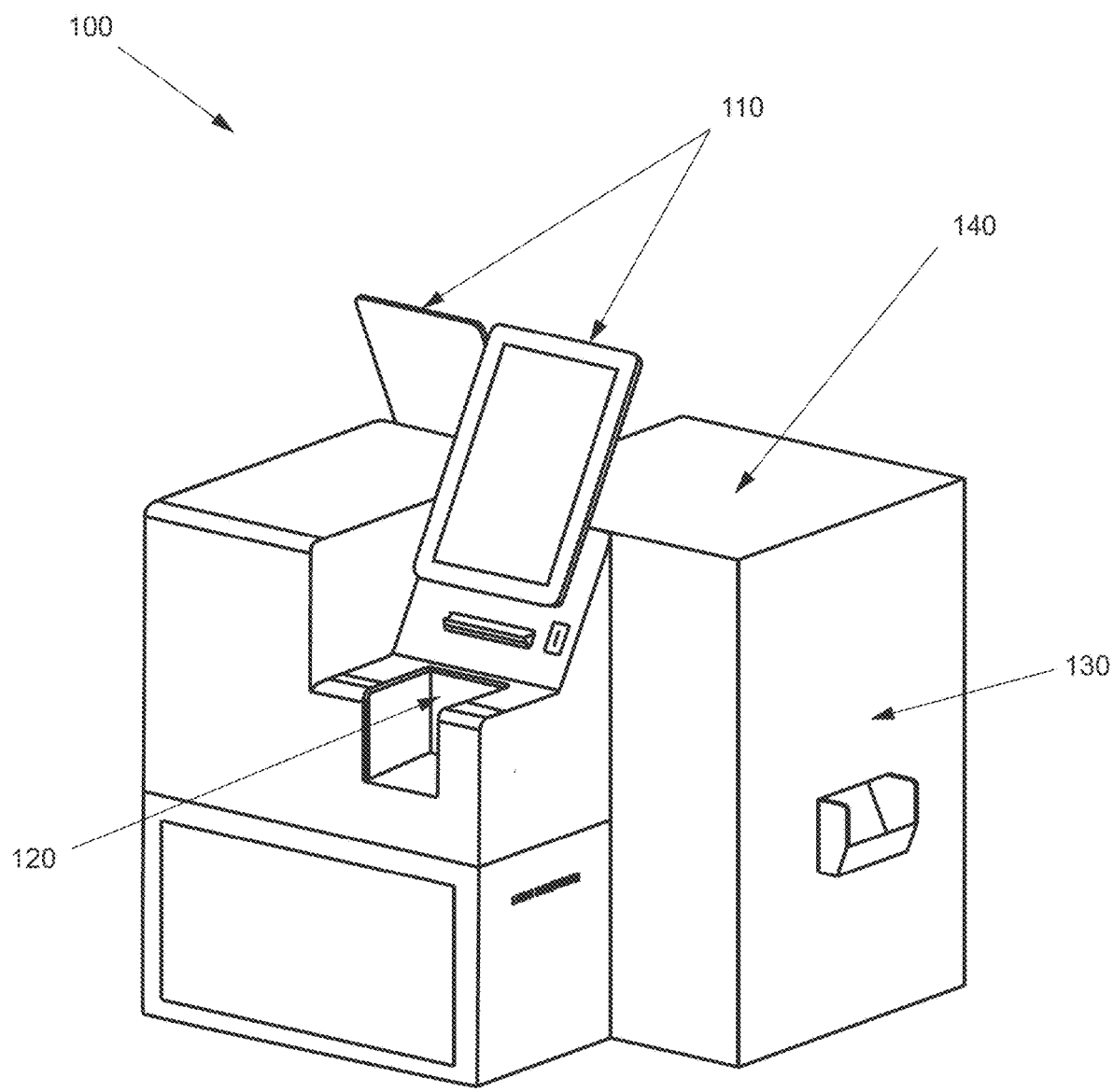
FIG. 1 illustrates a perspective view of an interactive automated till register system in accordance with an embodiment of the invention.

Unless otherwise indicated illustrations in the figures are not necessarily drawn to scale.

DETAILED DESCRIPTION OF THE PREFERRED EMBODIMENTS

Terminology used herein is used for the purpose of describing particular embodiments only, and is not intended to limit the scope of the present invention. It must be understood that as used herein and in the appended claims, the singular forms "a," "an," and "the" include the plural reference unless the context clearly dictates otherwise. For example, a reference to "an element" is a reference to one or more elements and includes all equivalents known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Language that may be construed to express approximation should be so understood unless the context clearly dictates otherwise.

Unless defined otherwise, all technical and scientific terms used herein have the same meanings as commonly understood by a person of ordinary skill in the art to which this invention belongs. Preferred methods, techniques, devices, and materials are described. But any methods, techniques, devices, or materials similar or equivalent to those described herein may be used in the practice or testing of the present invention. Structures described herein should also be understood to refer to functional equivalents of such structures.

References to "one embodiment," "one variant," "an embodiment," "a variant," "various embodiments," "numerous variants," etc., may indicate that the embodiment(s) of the invention so described may include particular features, structures, or characteristics. However, not every embodiment or variant necessarily includes the particular features, structures, or characteristics. Further, repeated use of the phrase "in one embodiment," or "in an exemplary embodiment," or "a variant," or "another variant," do not necessarily refer to the same embodiment although they may. A description of an embodiment with several components in communication with each other does not imply that all such components are required. On the contrary, a variety of optional components are described to illustrate the wide variety of possible embodiments and/or variants of the present invention.

A "computer" may refer to one or more apparatus and/or one or more systems that are capable of accepting a structured input, processing the structured input according to prescribed rules, and producing results of the processing as output. Examples of a computer may include: a personal computer (PC); a stationary and/or portable computer; a computer having a single processor, a computer having multiple processors, or a computer having multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer; a personal digital assistant (PDA); a portable telephone; a portable smartphone; wearable devices such as smartwatches; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

The term "processor" may refer to any device or portion of a device that processes electronic data from registers and/or memory to transform that electronic data into other electronic data that may be stored in registers and/or memory. A "computing platform" may comprise one or more processors.

A "microcontroller" generally refers a small computer on a single integrated circuit. A microcontroller contains one or more central processing units (processor cores) along with memory and programmable input/output peripherals. A typical microcontroller includes a processor, memory and input/output (I/O) peripherals on a single chip.

An "algorithm" is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

It will be readily understood by persons skilled in the art that the various methods and algorithms described herein may be implemented by appropriately programmed computers and computing devices. Typically, a processor (e.g., a microprocessor) will receive instructions from a memory or like device, and execute those instructions, thereby performing a process defined by those instructions. Further, programs that implement such methods and algorithms may be stored and transmitted using a variety of known media.

"Software" may refer to prescribed rules and/or instructions used to operate a computer. Examples of software may include: code segments in one or more computer-readable languages; graphical and or/textual instructions; applets; pre-compiled code; interpreted code; compiled code; and computer programs. An operating system or "OS" is software that manages computer hardware and software resources and provides common services for computer programs.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software program code for carrying out operations for aspects of the present invention can be written in any combination of one or more suitable programming languages, including an object oriented programming languages and/or conventional procedural programming languages, and/or programming languages such as, for example, Hypertext Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java.™., Jini.™., C, C++, Smalltalk, Perl, UNIX Shell, Visual Basic or Visual Basic Script, Virtual Reality Markup Language (VRML), ColdFusion™, SQL, Python, or other compilers, assemblers, interpreters or other computer languages or platforms.

A "computer-readable medium" may refer to any storage device used for storing data accessible by a computer. Examples of a computer-readable medium may include: a magnetic hard disk; a floppy disk; an optical disk, such as a CD-ROM and a DVD; a magnetic tape; a flash memory; a memory chip; and/or other types of media that can store machine-readable instructions thereon.

A "non-transitory computer readable medium" includes, but is not limited to, a hard drive, compact disc, flash memory, volatile memory, random access memory, magnetic memory, optical memory, semiconductor-based memory, phase change memory, optical memory, periodically refreshed memory, and the like; however, the non-transitory computer readable medium does not include a pure transitory signal per se.

A "computer system" may refer to a system having one or more computers, where each computer may include a computer-readable medium employing software to operate the computer or one or more of its components. Examples of a computer system may include: a distributed computer system for processing information via computer systems linked by a network; two or more computer systems connected together via a network for transmitting and/or receiving information between the computer systems; a computer system including two or more processors within a single computer; and one or more apparatuses and/or one or more systems that may accept data, may process data in accordance with one or more stored software programs, may generate results, and typically may include input, output, storage, arithmetic, logic, and control units.

A "network" may refer to a plurality of computers and associated devices that may be connected by communication channels to facilitate communication and resource sharing. A network may involve permanent connections such as cables or temporary connections such as those made through telephone, cable, wireless or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include, but are not limited to, an internet, such as the Internet or World Wide Web; an intranet; a personal area network (PAN); near field communication (NFC); a local area network (LAN); a wide area network (WAN); a virtual private network (VPN); internet of things (IoT); Blockchain; and a combination of networks, such as an internet and an intranet.

Exemplary networks may operate with any of a number of protocols such as, but not limited to, Transmission Control Protocol (TCP), Internet protocol (IP), Internet Address Protocol (IP Address), asynchronous transfer mode (ATM), Near Field Communication digital protocol, and/or synchronous optical network (SONET), user datagram protocol (UDP), IEEE 802.x, etc..

"Video" may refer to motion pictures represented in analog and/or digital form. Examples of video may include television, movies, image sequences from a camera or other observer, and computer-generated image sequences. Video may be obtained from, for example, a live feed, a storage device, an IEEE 1394-based interface, a video digitizer, a computer graphics engine, or a network connection.

A "point of sale" or "POS" system is a system is a combination of business transactional hardware and software to create a machine for processing transactions and payments. Electronic POS software systems streamline retail operations by automating the transaction process and tracking important sales data. Basic systems generally include an electronic cash register and software to coordinate data collected from daily purchases. Advanced systems can include a network of data-capture devices such as, but not limited to, credit card readers, radio frequency identification device readers, and barcode scanners. POS system software allows businesses to track important business data such as pricing, inventory changes, gross revenue, and sales patterns. Using integrated technology to track data helps retailers catch discrepancies in pricing or cash flow that could lead to profit loss or interrupt sales. POS systems that monitor inventory and purchase data help businesses facilitate myriad customer service issues.

A "cash recycler" is a cash storage machine that handles monies from incoming and outgoing transactions. Cash recyclers are capable of taking cash notes in, authenticating the denominations, checking for suspect bills, and then storing the cash for later transaction use. They are also capable of dispensing cash for transactions such as, but not limited to, cashing checks or account withdrawals in any denomination mix that a customer may desire. By storing cash that comes in from commercial or retail accounts and giving that same cash back out, cash funds are "recycled" instead of transporting cash which is deposited or withdrawn from a banking institution. Cash recyclers typically comprise a locked cash repository, a cash receptacle that receives cash and stores the cash in the cash repository, and a cash dispenser that dispenses cash from the cash repository. Cash recyclers can contain one or more cash drums which temporarily store currency notes and dispense those notes when necessary. When the drums are filled, the currency is then moved into the cash repository.

A "coin recycler" is a cash storage machine that handles coins from incoming and outgoing transactions. Coin recyclers are capable of taking coins in, authenticating the denominations, checking for suspect coins and then storing the coins for later transaction use. Coin recyclers are also capable of dispensing coins for transactions such as, but not limited to, breaking bills for change. By storing coins that come in from commercial or retail accounts and giving that same cash back out, coin funds are "recycled" instead of transporting coins which are deposited or withdrawn from a banking institution.

Embodiments of the automated till register system may include more than one apparatus for performing the operations disclosed herein. An apparatus may be specially constructed for the desired purposes, or it may comprise one or more general-purpose devices selectively activated or reconfigured by a program stored in the device. Moreover, embodiments of the automated till register system may employ differing shapes and sizes to achieve a customized look.

Embodiments of the interactive automated till register system may also be implemented in, or in a combination of, hardware, firmware, and software. Such embodiments may be implemented as instructions stored on a machine-readable medium, which may be read and executed by a computing platform to perform the operations described herein.

Unless specifically stated otherwise, and as may be apparent from the following description and claims, it should be understood that throughout this application's specification, descriptions utilizing terms such as "recording, "processing," "computing," "calculating," "determining," or the like, refer to the actions and/or processes of a computer, computing system, or any similar electronic computing device which manipulates and/or transforms data represented as physical quantities within the computing system's registers and/or memories into other data similarly represented as physical quantities within the computing system's memories, registers or other such information storage, transmission or display devices.

Aspects of the exemplary interactive automated till register system will be described below with reference to flowchart illustrations and/or block diagrams of methods, steps, apparatus (systems) and computer program products according to embodiments of the invention. Persons skilled in the art will understand that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the exemplary automated till register system. It will become readily apparent to persons skilled in the art that each block in the flowchart or block diagrams may represent a module, segment, or portion of code, which comprises one or more executable instructions for implementing the specified logical function(s). It will also be readily apparent to persons skilled in the art that in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any practical order.

It will also be understood by persons skilled in the art that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram blocks.

When a single device or article is described herein, it will be readily apparent to persons having skill in the art that more than one device or article or/machine (whether or not they cooperate) may be used in place of a single device or article or machine. Similarly, where more than one device or article or machine is described herein (whether or not they cooperate), it will be readily apparent that a single device/article may be used in place of the more than one device or article. Likewise, the functionality and/or the features of a device or article or machine may be alternatively embodied by one or more other devices or articles or machines which are not explicitly described as having such functionality and/or features. Thus, other embodiments of the present invention need not include a specific device in and of itself.

As is well known to those skilled in the art, many careful considerations and compromises typically must be made when designing the optimal manufacture or commercial implementation of such an automated till register system. A commercial implementation in accordance with the spirit and teachings of the invention may be configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art.

Systems will be described and provided with means and methods for providing and implementing an interactive automated till register system. The exemplary interactive automated till register system will now be described in detail with reference to embodiments thereof as illustrated in the accompanying drawings.

FIG. 1 illustrates a perspective view of an interactive automated till register system 100 in accordance with an embodiment of the invention. In an embodiment of the invention, the automated till register system comprises at least one Point of Sale (POS) system and interface 110, two cash recycler machines 120 and one coin recycler machine 130, the said cash recycler machines oriented on opposite sides of one another, one on a cashier side and one on a customer side. The coin recycler located in the middle of the system between both cash recyclers. This configuration is known as a twin opposite configuration, and its utility can substantially improve the workflow capabilities at any business that handles cash on a regular basis. The cash recycler machines are configured in such a manner that both customers and cashiers can insert cash with their right hand and utilize the point of sale (POS) with their left hand. Use of the coin recycler simply involves a customer or cashier inserting coins in a coin slot and receiving change in a coin receptacle. Persons skilled in the art will readily appreciate that a desktop work surface 140 may be created in such a setup. In other embodiments of the invention, a security barrier made from materials such as Lexan® may be placed between the cashier side and customer side.

Such a configuration of hardware allows for establishments to utilize cash payment methods when cash is handed to a cashier and when a payment is made by a customer on the opposite end. In the event that one cash recycler becomes inoperable, another cash recycler may be used. Moreover, such a setup allows for a greater cash storage capacity for both the recycler drums and the secure storage receptacle. By way of example, and not limitation, a setup could be successfully implemented at a bar wherein the bartender's time could be better spent preparing customer beverages and not closing out a check.

In the preferred embodiment of the invention, the two cash recyclers are designed to integrate and be networkable with current POS systems. The automated till register system provides for easy network connection for different input/output devices at a point of sale (POS) system. Such devices include, but are not limited to, bar code readers, QR code readers, lottery ticket readers and payout machines, touch screen interface, keyboards, mice, track balls and register keypads.

In one embodiment of the invention, the two cash recycler machines are CashPhenix® SecureCash® machines. Other suitable cash and coin recyclers can be modified to create a twin opposite configuration as well. The cash recycler machines, however, share a common secure cash receptacle and cash drums which are configured to house sufficient cash reserves while being able to temporarily and securely house cash until it is either picked up by a secure courier or hand delivered to a financial institution.

The twin opposite configuration has multiple advantages over current POS and cash recycler systems. In embodiments of the invention, both cash recyclers work in tandem with one another. They can either be involved in fulfilling the same transaction (e.g. the payment can be accepted by one recycler, and the change paid out by other recycler), or they can serve two separate clients at the same time (e.g. one can be used by an employee such as a bartender to accept the payment of the client, and second one is used by server to accept the payment of a restaurant guest). Such a system provides for higher reliability, as there are two cash recycler machines which may be used at a single location. Such a system offers greater flexibility in ways payments can be accepted, either by a customer directly or through assistance from a cashier. For businesses using an automated till register system having the twin opposite configuration, the need for a cash drawer is completely eliminated. Moreover, the twin opposite configuration also provides for a higher bill storage capacity.

In some embodiments, users may access software through use of any suitable POS system device 110. In many embodiments, the POS system device 110 may establish a connection to each component through a wired or wireless connection. In some embodiments, users may register and/or login to access the software. In some alternate embodiments, users may be required to pay per use or sign up for a subscription for multiple uses. In some embodiments, each use may comprise any number of optional components, including, without limitation, a question category, text fields, spreadsheets, documents, photos, videos, audio samples, drawings, and/or website uniform resource locators (URLs).

Figure 2:
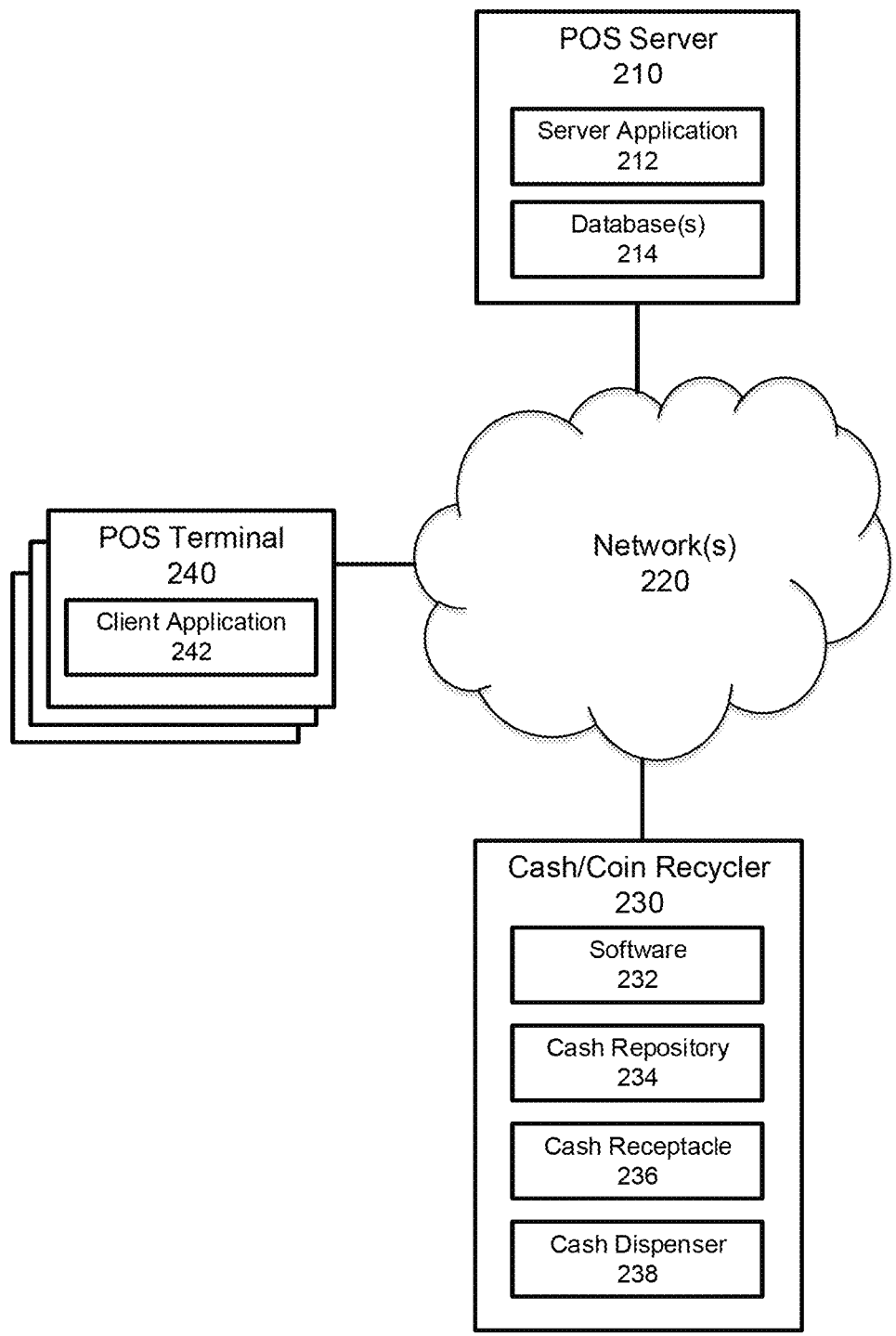
FIG. 2 illustrates a point-of-sale (POS) system with an automated till register system according to an embodiment of the invention.

FIG. 2 illustrates a point-of-sale (POS) system 200 with an automated till register system 100, according to an embodiment of the invention. The POS system may comprise at least one POS server 210 which hosts and/or executes software that manages sales transactions (e.g., opening and closing checks, determining check amounts, etc.). The POS server 210 may comprise dedicated servers, or may instead comprise cloud instances, which utilize shared resources of one or more servers. These servers or cloud instances may be collocated and/or geographically distributed. The entire system 200, including POS server 210, will typically be located within the establishment which it services. However, in some implementations, POS server 210 could be located outside of the establishment (e.g., at a regional or central office, in the cloud, etc.).

POS server 210 may comprise or be communicatively connected to a server application 212 and/or one or more databases 214. In addition, POS server 210 may be communicatively connected to cash recycler/coin recycler machines 230 via one or more networks 220. Platform 210 may also be communicatively connected to one or more POS terminals 240 via network(s) 220.

Network(s) 220 may comprise a local area network and/or a wide area network (e.g., the Internet) and may comprise a private and/or public network. For example, in an implementation in which the entire POS system 200 is located within an establishment, network(s) 220 may consist of a single local area network. In contrast, in an implementation in which POS server 210 is remotely located (e.g., in the cloud), networks 120 may comprise both a public, wide area network that connects POS server 210 to a private, local area network (e.g., via a gateway), and the private, local area network which may comprise cash recycler/coin recycler machines 230 and POS terminal(s) 240.

POS server 210 may communicate with cash recycler/coin recycler machines 230 and/or POS terminal 240 using standard transmission protocols, such as HyperText Transfer Protocol (HTTP), HTTP Secure (HTTPS), File Transfer Protocol (FTP), FTP Secure (FTPS), Secure Shell FTP (SFTP), and the like, as well as proprietary protocols. While POS server 210 is illustrated as being connected to various systems through a single set of network(s) 220, POS server 210 may be connected to the various systems via different sets of one or more networks. For example, POS server 210 may be connected to automated till registersystem 230 via a first network, but may be connected to POS terminal(s) 240 via a second, different network. Furthermore, while only a single cash machine 230, a few POS terminals 140, one server application 212, and one set of database(s) 214 are illustrated, the infrastructure may comprise any number of cash recycler/coin recycler machines 230, POS terminals 240, server applications 212, and databases 214. However, in some scenarios, it may be desirable for each establishment to have only a single cash machine for more centralized cash management.

POS terminal 240 may comprise any type or types of computing devices capable of wired and/or wireless communication, including without limitation, desktop computers, laptop computers, tablet computers, smart phones or other mobile phones, electronic kiosks, and/or the like. POS terminal 240 may execute a client application 242 which communicates with server application 212 to provide a graphical user interface. Client application 242 may be "thin," in which case processing is primarily carried out server-side by server application 212 on POS server 210. For example, client application 242 may be a browser application which renders the graphical user interface generated by server application 212. POS server 212 may transmit or serve one or more screens of the graphical user interface in response to requests from POS terminal(s) 240. In some embodiments, these screens may be served in the form of a wizard, in which case two or more screens may be served in a sequential manner, and one or more of the sequential screens may depend on an interaction of the user with one or more preceding screens. The requests to POS server 210 and the responses from POS server 210, including the screens of the graphical user interface, may both be communicated through network(s) 220 using standard communication protocols (e.g., HTTP, HTTPS, etc.). These screens (e.g., webpages) may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and the like, including elements comprising or derived from data stored in one or more databases (e.g., database(s) 214) that are locally and/or remotely accessible to POS server 110. In an embodiment, POS terminal 240 may comprise a touch panel display which allows users (e.g., employees) to perform touch operations to input elements of the graphical user interface. Alternatively, POS terminal 240 may comprise a non-touch-sensitive display with standard hardware inputs.

POS server 210 may comprise, be communicatively coupled with, or otherwise have access to one or more database(s) 214. For example, POS server 210 may comprise one or more database servers which manage one or more databases 214. A POS terminal 140 or server application 212, executing on POS server 210, may submit data (e.g., user data, form data, etc.) to be stored in database(s) 214, and/or request access to data stored in database(s) 214. Any suitable database may be utilized, including without limitation MySQL™, Oracle™, IBM™, Microsoft SQL™, Access™, and the like, including cloud-based databases and proprietary databases. Data may be sent to POS server 210, for instance, using the well-known POST request supported by HTTP, via FTP, and/or the like. This data, as well as other requests, may be handled, for example, by server-side web technology, such as a servlet or other software module (e.g., comprised in server application 212), executed by POS server 210.

POS server 210 and POS terminal(s) 240 may be third-party devices, such as those in the Aloha POS™ system provided by NCR Corporation of Atlanta, Ga., the Micros POS™ system provided by Oracle Corporation of Redwood Shores, Calif., the Aldelo POS system provided by Aldelo, L.P. of Pleasanton, Calif., or the Revel POS system by Revel Systems, Inc. of San Francisco, Calif. In an embodiment, the cash recycler/coin recycler machines 230 are proprietary devices such as, but not limited to, the CashPhenix® SecureCash® machine that are modified and integrated with a third-party POS system. In such an embodiment, cash recycler/coin recycler machines 230 may communicate with third-party POS devices (e.g., POS server 210 and POS terminal(s) 240) via software residing the cash recycler/coin recycler machines 230 and/or the third-party POS devices. For example, software 232 on cash recycler/coin recycler machines 230 may communicate with the third-party POS devices via an application programming interface (API) provided by the third-party POS devices.

Figure 3:
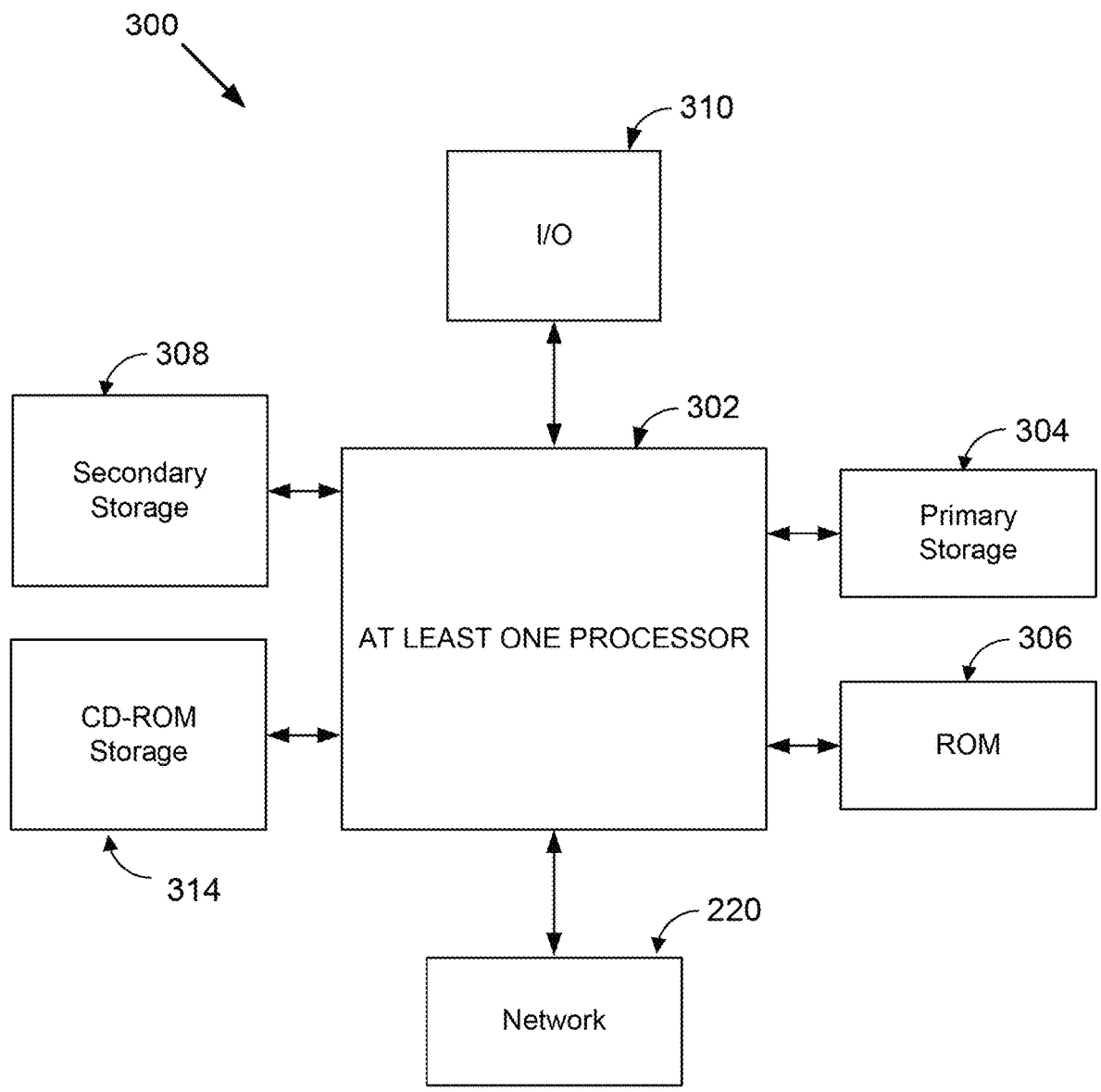
FIG. 3 illustrates a typical computer system that, when appropriately configured or designed, may serve as a computer system for which the automated till register system, and the components thereof, may be embodied.

FIG. 3 illustrates a typical computer system that, when appropriately configured or designed, may serve as a computer system for which the automated till register system, and the components thereof, may be embodied. The computer system 300 includes at least one processors 302 (also referred to as central processing units, or CPUs) that may be coupled to storage devices including a primary storage 306 (typically a random-access memory, or RAM), a primary storage 304 (typically a read-only memory, or ROM). CPU 302 may be of various types including micro-controllers (e.g., with embedded RAM/ROM) and microprocessors such as programmable devices (e.g., RISC or SISC based, or CPLDs and FPGAs) and devices not capable of being programmed such as gate array ASICs (Application Specific Integrated Circuits) or general purpose microprocessors. As is well known in the art, primary storage 304 acts to transfer data and instructions uni-directionally to the CPU and primary storage 306 typically may be used to transfer data and instructions in a bi-directional manner. The primary storage devices discussed previously may include any suitable computer-readable media such as those described above. A mass storage device 308 may also be coupled bi-directionally to CPU 302 and provides additional data storage capacity and may include any of the computer-readable media described above. Mass storage device 308 may be used to store programs, data and the like and typically may be used as a secondary storage medium such as a hard disk. It will be appreciated that the information retained within mass storage device 308, may, in appropriate cases, be incorporated in standard fashion as part of primary storage 306 as virtual memory. A specific mass storage device such as a CD-ROM 314 may also pass data unidirectionally to the CPU. In such an embodiment, the CPU can reside in a cash recycler/coin recycler machine or it could reside in a POS system, the instructions for operating each machine being stored as memory in primary storage 304, 306 or mass storage 308.

CPU 302 may also be coupled to an interface 310 that connects to one or more input/output devices such as track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 302 optionally may be coupled to an external device such as a database or a computer or telecommunications or internet network using an external connection shown generally as a network 220, which may be implemented as a hardwired or wireless communications link using suitable conventional technologies. With such a connection, the CPU might receive information from the network, or might output information to the network in the course of performing the method steps described in the teachings of the present invention.

It will be understood by persons having skill in the art that memory storing computer readable instructions that, when executed by the at least one processor, cause the automated till register system by at least one processor in each cash recycler machine comprising a locked cash repository, a cash receptacle that receives cash and stores the cash in the cash repository, and a cash dispenser that dispenses cash from the cash repository, for each of a plurality of transactions 1) process cashless transactions at the at least one Point of Sale (POS) system; 2) for cash transactions, determine an amount of cash received, via the cash receptacle, for cash transactions, validate the received cash, and transmit a cash-payment notification to the at least one Point of Sale (POS) system server over at least one network, wherein the cash-payment notification indicates the amount of cash and a transaction identifier that identifies the transaction; 3) by at least one hardware processor of the POS server, receive the cash-payment notification from the cash machine over the at least one network, if the amount of cash indicated in the cash-payment notification is sufficient to satisfy payment for the transaction identified in the cash-payment notification, determine whether or not change is due for the transaction, when determining that change is due, transmit a change notification to a specific cash recycler machine over the at least one network, wherein the change notification indicates an amount of the change due for the transaction, and automatically close the transaction; and 4) by the at least one hardware processor of the cash recycler machine, when a change notification is transmitted by the POS server, receive the change notification from the POS server over the at least one network, and dispense the amount of the change that is indicated in the change notification via the cash dispenser.

The invention can be further implemented as machine readable instructions detailing a method for operating an automated till register system comprising the steps of entering and allowing transactions at a plurality of point of sale devices; communicating information regarding the transactions from the said point of sale devices to at least one automated till register system, the transactions including cash and non-cash payments; using the information in order to identify an expected count; moving transaction-related materials from the point of sale devices to said at least one automated till register system; counting, by a processor, at least some of said transaction-related materials in order to identify an actual count; comparing, by the processor, the actual count to the expected count; communicating the actual count and the expected count to an accounting system; and networking a plurality of cash and coin recyder devices to act together as a combined unit. Further memory instructions such as a general method and workflow model shall be described in further detail.

Figure 4:
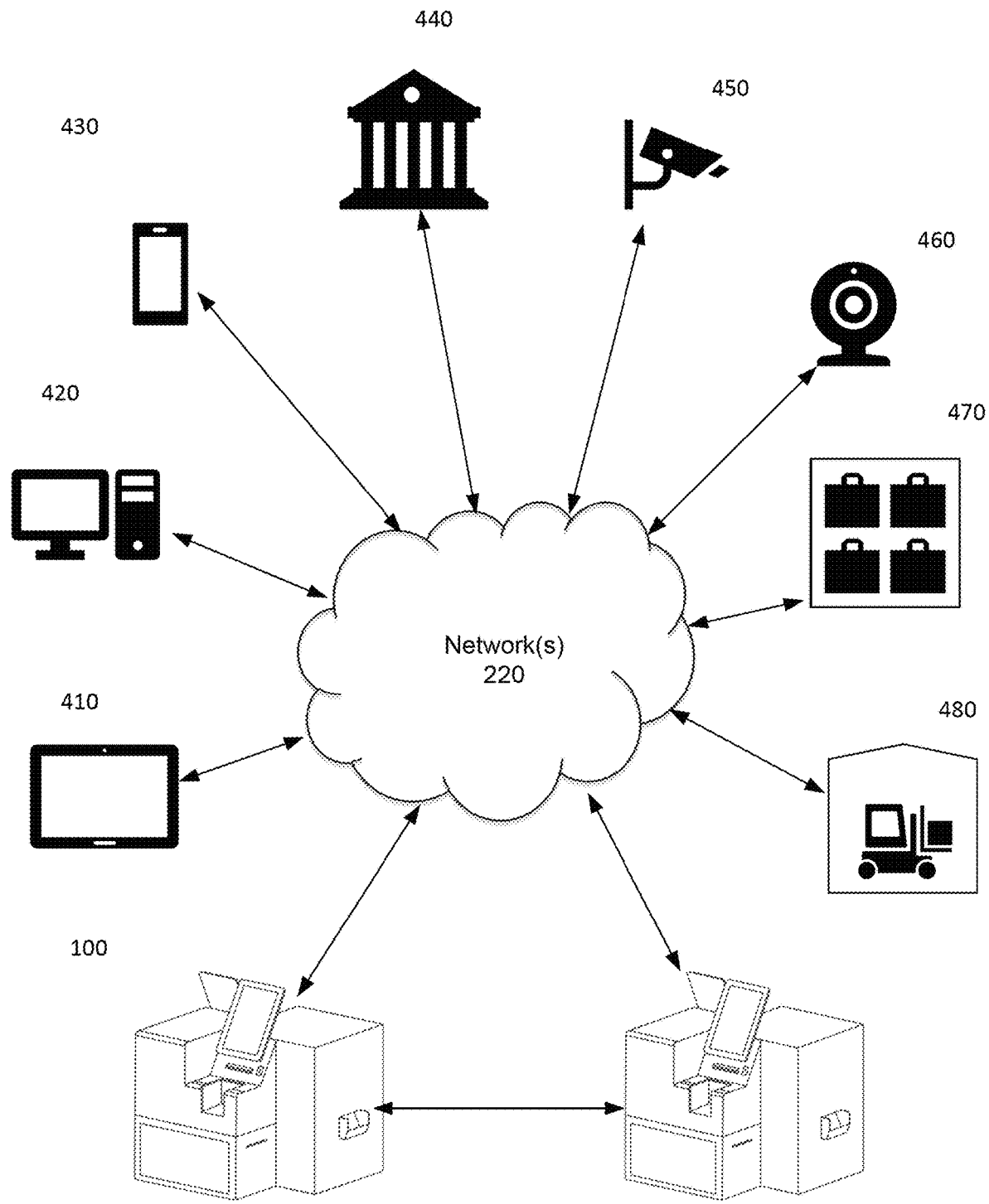
FIG. 4 illustrates a network diagram in which the exemplary automated till register system may be implemented.

FIG. 4 illustrates a network diagram in which the exemplary automated till register system may be implemented. In addition to a basic network and being able to network from machine to machine, the automated till register system may network bot bi- and unidirectionally with tablet form POS devices 410, back office and/or central office computer systems 420, mobile devices 430 belonging to both customers and workers alike, financial institutions 440 for recording transactions and processing payments, building security and/or camera systems 450, device webcam identification systems 460, inventory databases 470, supply chain networks 480. Persons having skill in the art will appreciate that the automated till register system's ability to network with video security systems offers a greater level of protection from theft and unauthorized use.

Figure 5:
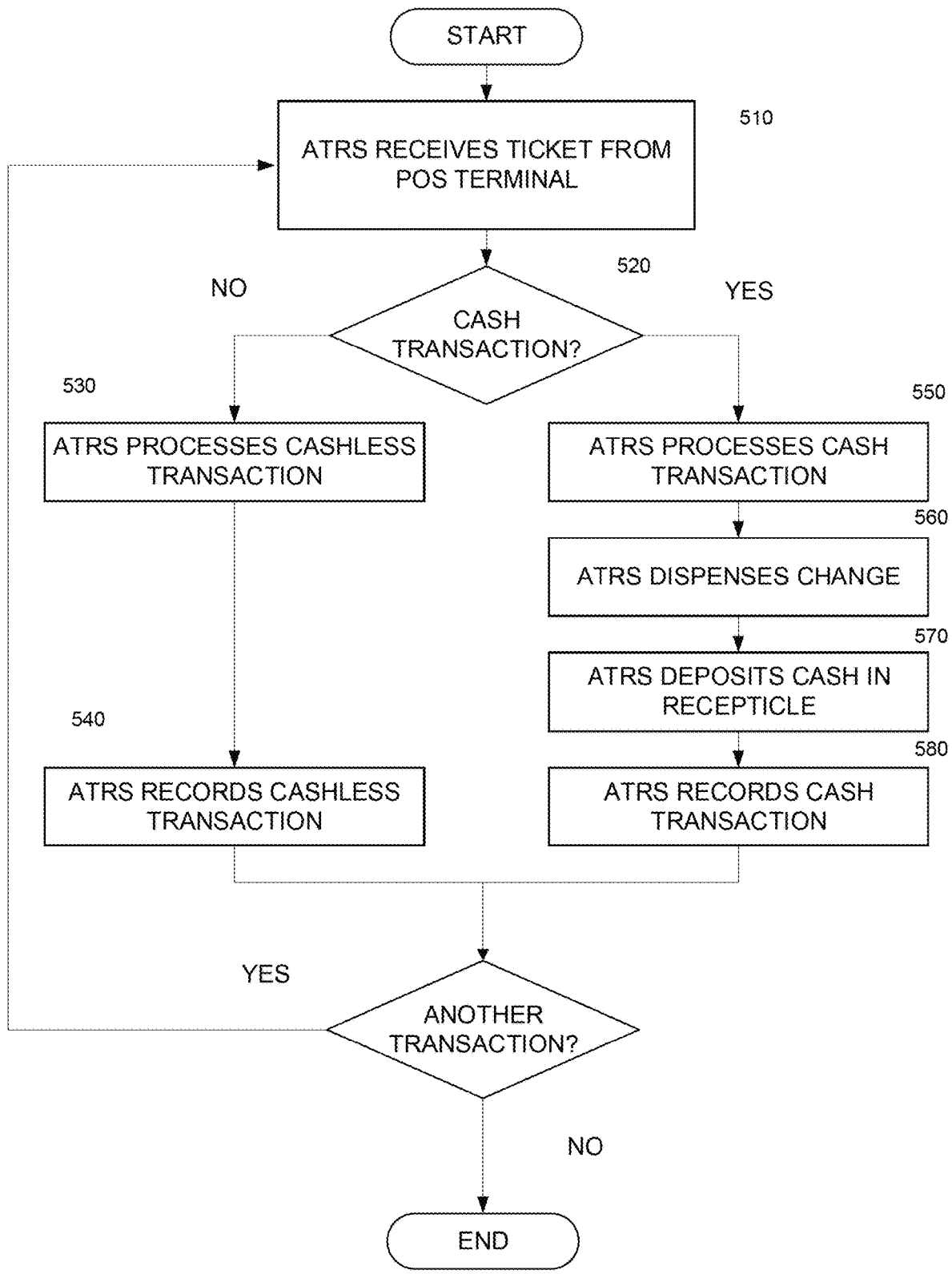
FIG. 5 illustrates a flowchart depicting a general method for performing transactions on an interactive automated till register system in accordance with an embodiment of the present invention.

FIG. 5 illustrates a flowchart depicting a general method for performing transactions on an interactive automated till register system in accordance with an embodiment of the present invention. Transactions can originate on a point of sale (POS) system or can be entered on the automated till register system itself. The automated till register system is designed to integrate with existing systems using network protocols known and understood by those with ordinary skill in the art. A typical transaction begins with the automated till register system (ATRS) receiving a ticket from a point of sale (POS) terminal 510. A POS terminal, for ease of understanding, can be any device used to enter and or record transactional data. A user chooses whether the transaction will be paid in cash or whether it will be paid by other electronic means 520. If a user chooses to pay cashless 530, the automated till register system processes the cashless transaction 530 and then records the cashless transaction 540. If a user chooses to pay in cash, the automated till register system processes the cash transaction 550 by determining validity and denomination of currency inserted and dispenses change 560. The automated till register system then deposits the cash in a secure receptacle for temporary storage 570. The automated till register system then records the cash transaction 580. The automated till register system can provide alerts when currency levels are low. Persons having skill in the art will readily appreciate that such a general method can include more detailed steps which can be programmed as software and stored as memory including readable instructions for the automated till register system.

Figure 6:
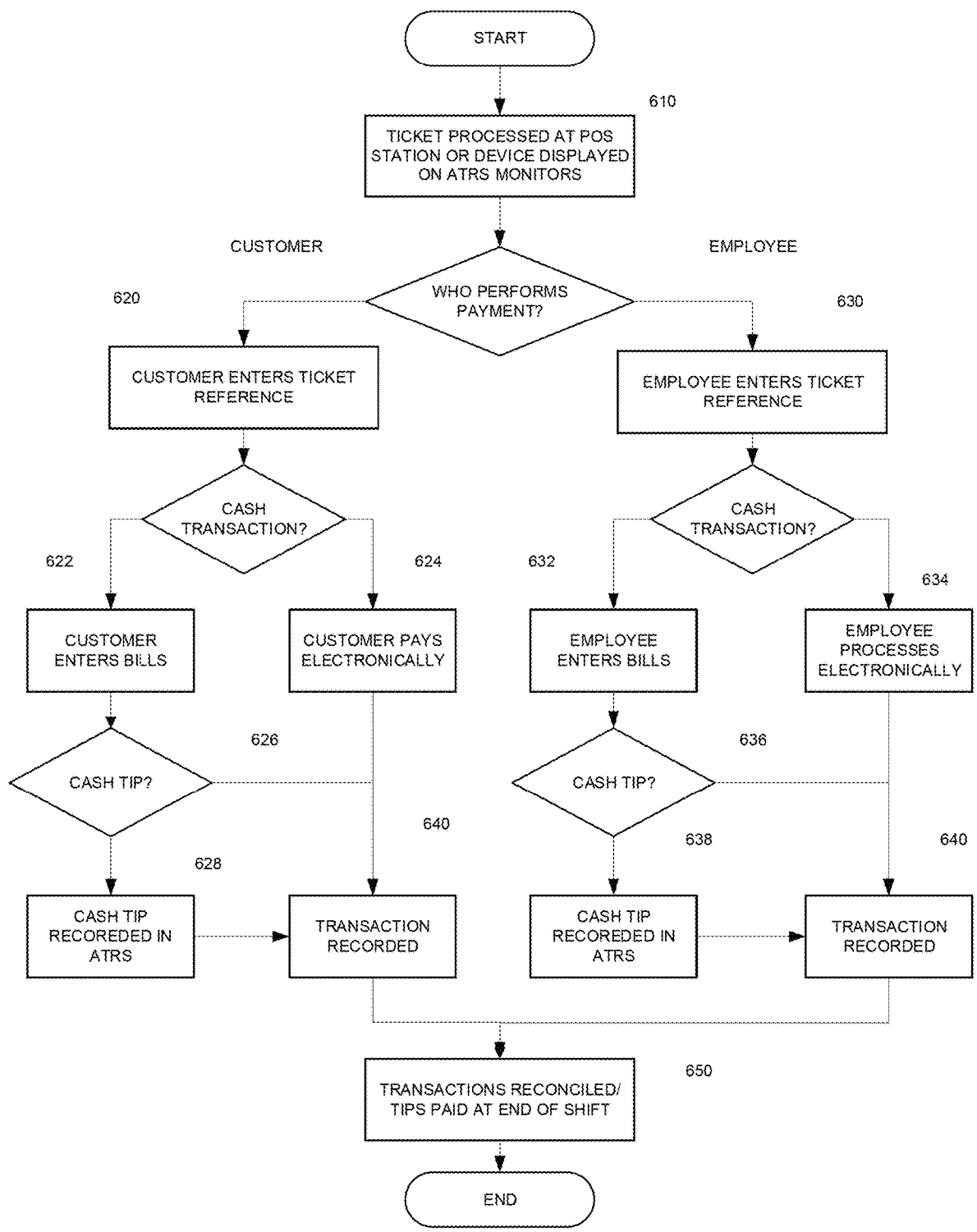
FIG. 6 illustrates a flowchart depicting a general method for using an interactive automated till register system in accordance with an embodiment of the present invention.

FIG. 6 illustrates a flowchart depicting a general method for using an interactive automated till register system in accordance with an embodiment of the present invention. In the present embodiment, a transaction ticket is generated and processed on a typical point of sale (POS) system. When the ticket is ready to be closed and paid, the ticket is processed and displayed at and is displayed on one or more of the monitors of the exemplary automated till register system 610.

A customer then has the option of paying the ticket using the automated till register system or to have a cashier process the ticket on the opposite end of the automated till register system from the cashier side. The customer can enter the ticket reference on the interface 620. The automated till register system will then prompt the customer to choose a method of payment. If the customer chooses to pay in cash, the automated till register system will prompt the cash recycler to accept bills which the customer inserts 622. The customer may pay electronically through known mean such as credit cards, debit cards, electronic wallet, or other electronic payment methods 624. The automated till register system will prompt the customer if the customer wishes to give a gratuity or tip from the amount tendered. If yes, then the automated till register system will record the tip amount along with the transaction 626. The cash If no, then the transaction is simply recorded as normal 640. At a later time, such as the end of a shift, transactions are reconciled with tips being paid at the end of the shift or at a future date 650.

A cashier or other employee also has the option of paying the ticket using the automated till register system or to have a cashier process the ticket on the opposite end of the automated till register system from the customer side. The customer can enter the ticket reference on the interface 630. The automated till register system will then prompt the customer to choose a method of payment. If the customer chooses to pay in cash, the automated till register system will prompt the cash recycler to accept bills which the customer inserts 632. The customer may pay electronically through known mean such as credit cards, debit cards, electronic wallet, or other electronic payment methods 634. The automated till register system will prompt the customer if the customer wishes to give a gratuity or tip from the amount tendered. If yes, then the automated till register system will record the tip amount along with the transaction 636. The cash If no, then the transaction is simply recorded as normal 640. At a later time, such as the end of a shift, transactions are reconciled with tips being paid at the end of the shift or at a future date 650.

Figure 7A:
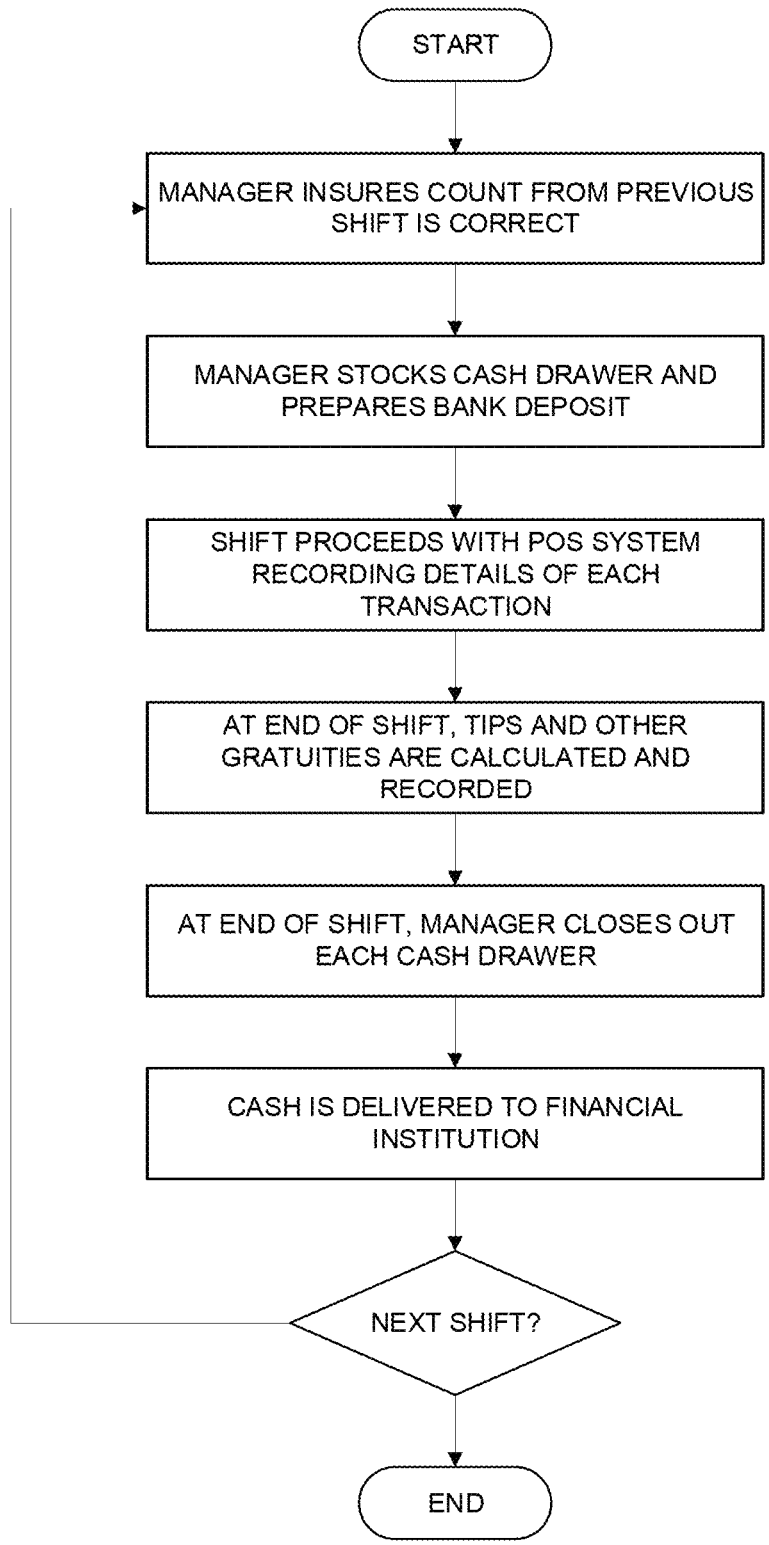
FIG. 7A illustrates a prior art workflow diagram.

FIG. 7A illustrates a typical prior art workflow diagram representing how cash is at every phase of the transactional process in a business setting. Persons having skill in the art will understand that such transactions regularly occur at businesses handling high volumes of transactions over Point of Sale (POS) systems and networks. Such businesses include, but are not limited to, restaurants, bars, convenience stores and cannabis dispensaries. At the beginning of any given work shift, a manager typically insures the register count from the previous shift is correct and matches with the transactions performed over a POS system and/or network. The manager then insures that the cash drawer is properly stocked and prepares excess cash to be deposited with a financial institution. From there, a shift commences with the POS system and network recording each detail of each transaction. In instances where tips and/or gratuities are calculated and paid, a POS system calculates tips from both cash and cashless transactions. In some instances, tips and gratuities are paid from the cash register at the end of each shift. In other instances, tips are paid as a payment at a future time. At the end of a given shift, the manager closes out each cash drawer by insuring that the cash count matches with what was recorded in the POS system and network. Excess cash is stored and then delivered to a financial institution at a future time.

Figure 7B:
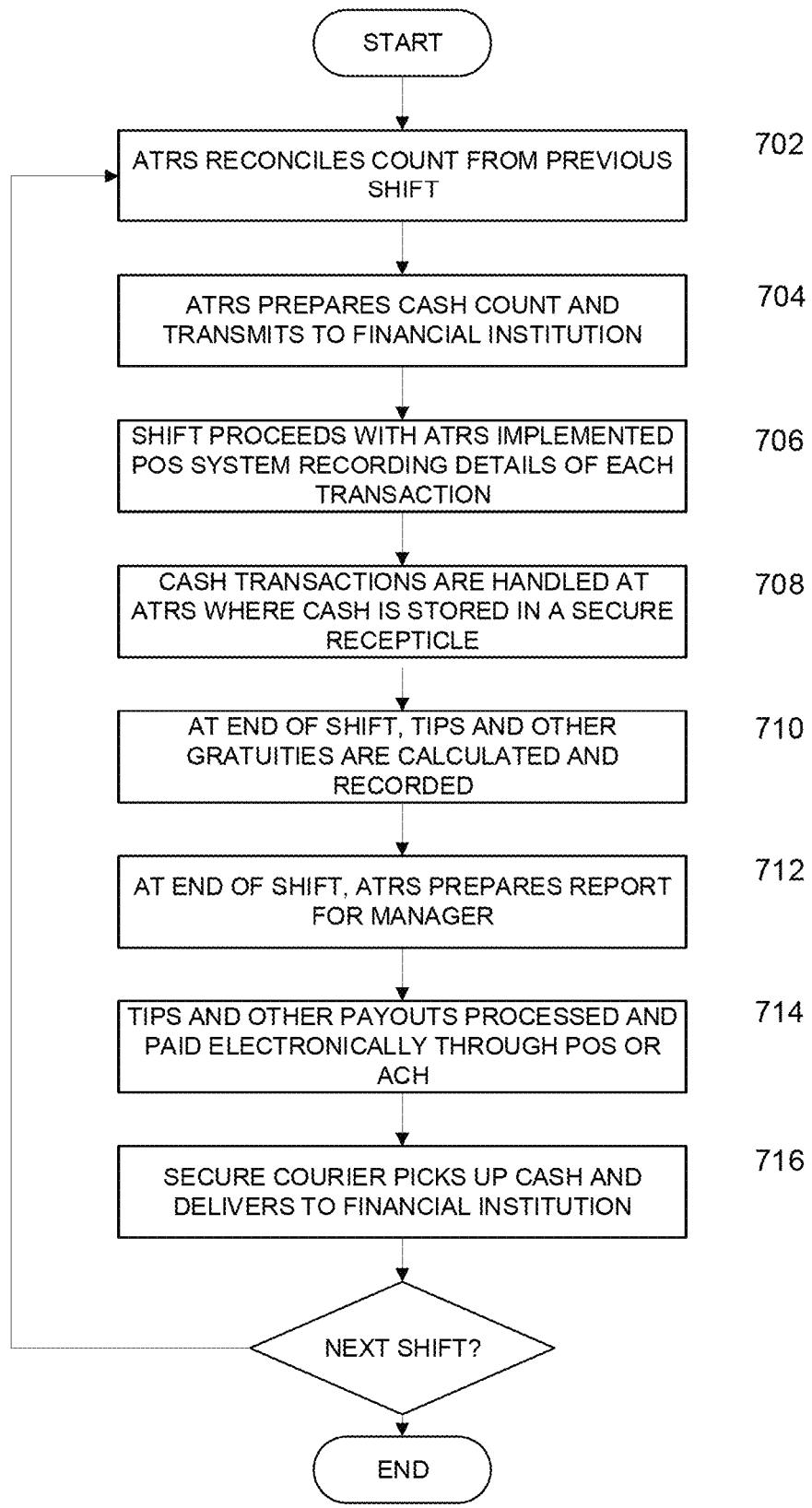
FIG. 7B illustrates a workflow diagram in which the exemplary automated till register system may be configured to perform.

FIG. 7B illustrates a general workflow method diagram with the automated till register system successfully implemented in a place of business. Persons having skill in the art will appreciate that additional steps can be added to the exemplary workflow method in order to increase functionality or performance. It will be further appreciated by persons having skill in the art that such a method can be stored as computer readable instructions that, when executed by the at least one processor of the automate till register system, cause the automated till register system to perform such a workflow method. In business settings where cash transactions are frequently performed, the automated till register system represents a major breakthrough in workflow and cash management.

At the beginning of a given shift, the automated till register system reconciles the cash count from the previous shift through the use of a cash recycler which mechanically identifies and counts currency bills 702. The automated till register system can then generate a cash count and transmit such information to a financial institution 704 should a cash refill or cash pick-up be necessary. The shift then proceeds with the automated till register system recording details of each transaction conducted on or over a point of sale (POS) system or network 706. Cash transactions are performed at the automated till register system where cash is counted in a cash drum of the cash recycler and stored in a secure receptacle 708. At the end of the shift, tips and other gratuities are calculated over the POS system and network with cash being stored in the secure receptacle 710. After a given shift, the automated till register system can prepare a report for the shift manager 712. Additionally, the tips can be paid out in cash from the automated till register system itself, or tips can be paid out electronically through a point of sale (POS) transaction or an Automated Clearing House (ACH) payment from a financial institution 714.

In such a system, cash handling by employees is significantly reduced while cash is securely stored in the automated till register system. Additionally, a secure courier can simply pick up the surplus cash from the secure receptacle of the automated till register system when necessary 716. Such a tip or gratuity processing system gives businesses the opportunity to always have available cash while still being able to record and pay out tips and other gratuities at the end of an employee's shift or at a later time.

Figure 8:
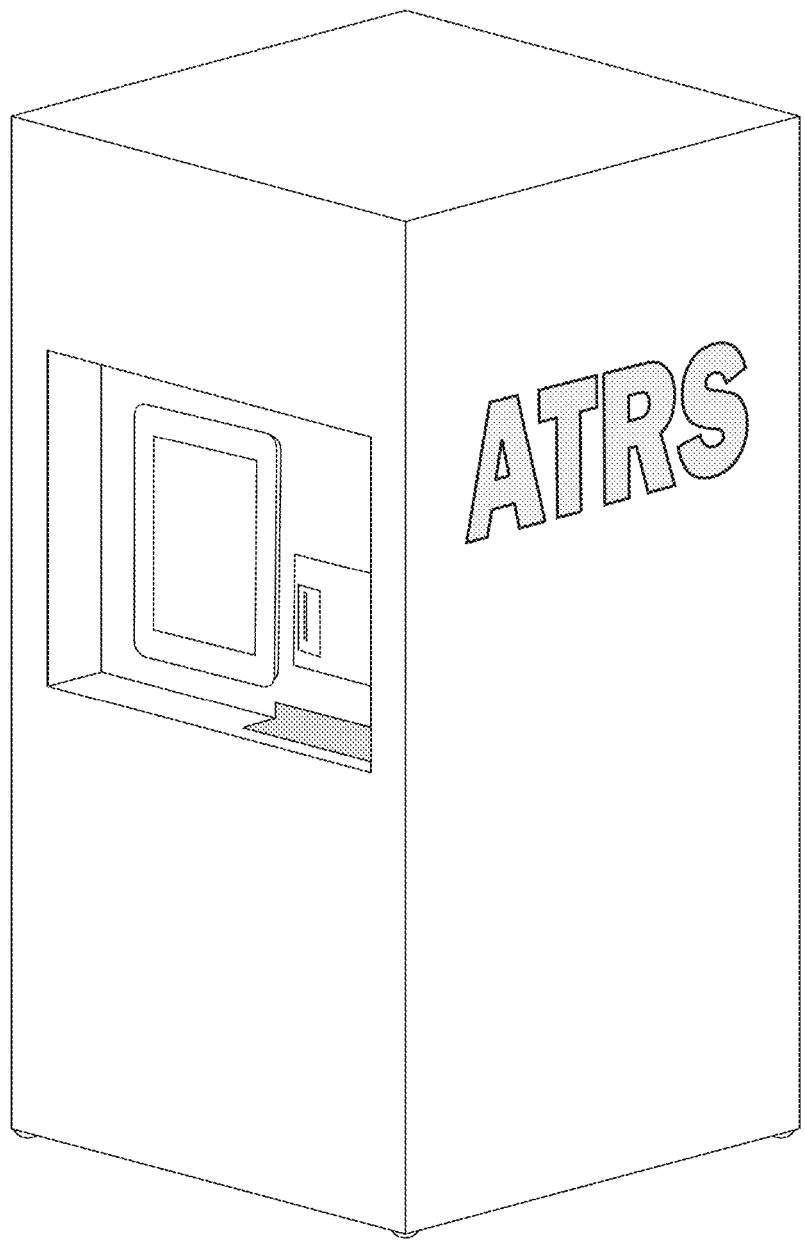
FIG. 8 illustrates an autonomous automated till register system in accordance with an embodiment of the invention.

FIG. 8 illustrates an autonomous automated till register system 800 in accordance with an embodiment of the invention. By way of illustration, and not limitation, it will be understood by persons having skill in the art that the automated till register system can be configured and implemented using the twin opposite configuration as an autonomous vehicle capable of moving throughout a given space. The at least one processor of the automated till register system can be connected with currently emerging autonomous vehicle technology with memory having computer readable instructions capable of operating such an autonomous embodiment. Persons having skill in the art will further appreciate that numerous means, components, security systems, and methods may be used to provide such an autonomous system. Such an embodiment my function at trade shows, sporting events, fairs, conventions, and other functions where large groups of people may require an automated till register system capable of handling both cash and cashless transactions.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Having fully described at least one embodiment of the automated till register system, other equivalent or alternative methods of implementing the automated till register system according to the present invention will be apparent to those skilled in the art. Various aspects of the automated till register system have been described above by way of illustration, and the specific embodiments disclosed are not intended to limit the invention to the particular forms disclosed. The particular implementation of the automated till register system may vary depending upon the particular context or application. By way of example, and not limitation, the automated till register system described in the foregoing was principally directed to restaurant and retail point of sale systems. However, similar techniques may instead be applied to other point of sale systems which implementations of the present invention are contemplated as within the scope of the present invention. Additionally, differing combinations and arrangements of display and dispensing and input/output technologies may be implemented to achieve a more desirable appearance. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Although specific features of the automated till register system are shown in some drawings and not others, persons skilled in the art will understand that this is for convenience. Each feature may be combined with any or all of the other features in accordance with the invention. The words "including," "comprising," "having," and "with" as used herein are to be interpreted broadly and comprehensively, and are not limited to any physical interconnection. Claim elements and steps herein may have been numbered and/or lettered solely as an aid in readability and understanding. Any such numbering and lettering in itself is not intended to and should not be taken to indicate the ordering of elements and/or steps in the claims to be added at a later date.

Any amendment presented during the prosecution of the application for this patent is not a disclaimer of any claim element presented in the description or claims to be filed. Persons skilled in the art cannot reasonably be expected to draft a claim that would literally encompass each and every equivalent.

What is claimed is:

1. An automated till register system, comprising:
   a. at least one processor;
   b. at least one Point of Sale (POS) system and interface networked with the said automated till register system;
   c. two cash recycler machines and one coin recycler machine in a twin opposite configuration, said cash recycler machines oriented on opposite sides of one another, one on the cashier side and one on the customer side with the coin recycler located in the middle of the system between both cash recyclers; and
   d. memory storing computer readable instructions that, when executed by the at least one processor, cause the automated till register system by at least one processor in each cash recycler machine comprising a locked cash repository, a cash receptacle that receives cash and stores the cash in the cash repository, and a cash dispenser that dispenses cash from the cash repository, for each of a plurality of transactions
      i. process cashless transactions at the at least one Point of Sale system;
      ii. for cash transactions, determine an amount of cash received, via the cash receptacle, for cash transactions, validate the received cash, and transmit a cash-payment notification to the at least one Point of Sale (POS) system server over at least one network, wherein the cash-payment notification indicates the amount of cash and a transaction identifier that identifies the transaction;
      iii. by at least one hardware processor of the POS server, receive the cash-payment notification from the cash machine over the at least one network, if the amount of cash indicated in the cash-payment notification is sufficient to satisfy payment for the transaction identified in the cash-payment notification, determine whether or not change is due for the transaction, when determining that change is due, transmit a change notification to a specific cash recycler machine over the at least one network, wherein the change notification indicates an amount of the change due for the transaction, and automatically close the transaction; and
      iv. by the at least one hardware processor of the cash recycler machine, when a change notification is transmitted by the POS server, receive the change notification from the POS server over the at least one network, and dispense the amount of the change that is indicated in the change notification via the cash dispenser.

2. The automated till register system of claim 1 further comprising memory storing computer readable instructions, when executed by the at least one processor, for a work shift
   a. reconciles cash count from a previous shift;
   b. prepares and performs cash count;
   c. transmits cash count data to financial institution;
   d. records details of each POS transaction during the present shift;
   e. calculates tips and tip payouts at the end of each shift;
   f. prepares shift report for manager; and
   g. notifies secure courier when cash is to be delivered to financial institution.

3. The automated till register system of claim 2 further comprising memory storing computer readable instructions, when executed by the at least one processor, for a post-shift
   a. reconciles inventory with recorded transactions; and
   b. communicates with warehouse for delivery of needed items.

4. The automated till system of claim 1 wherein tips and tip payouts can be paid as a cash payout at the end of a shift or as an electronic payment at a future time.

5. The automated till system of claim 1 wherein the at least one Point of Sale (POS) system is configured to accept and record cashless payments.

6. The automated till register system of claim 1 wherein the system is configured to store and dispense at least one currency bill and at least currency coin of each of the different denominations of said currency bill and said currency coin, and the refill amount is determined for each of the different denominations for which the refill operation should be performed.

7. The automated till register system of claim 1 wherein the system is networkable with banking institutions.

8. The automated till register system of claim 1 wherein the system is networkable with inventory and logistics.

9. The automated till register system of claim 1 wherein the system is networkable with security systems.

10. The automated till register system of claim 1 wherein the system is configured as a single station where a customer may access the automated till register system from one side and authorized users may access from the opposite side of the automated till register system.

11. The automated till register system of claim 1 wherein tips and gratuities are paid out of the system as a cash payment at the end of a worker's shift.

12. The automated till register system of claim 1 wherein tips and gratuities are recorded and funds are transferred to workers at a later time.

13. The automated till register system of claim 1 wherein the locked cash repository is and armored vault and can be accessed by authorized personnel and authorized third-party personnel only.

14. A method of cash and cashflow management for businesses comprising:
transactions at an automated till register system comprising at least one processor, at least one point of sale (POS) system and interface, at least one automated till register system consisting of two cash recyclers and one coin recycler in a twin opposite configuration, said cash recyclers oriented on opposite sides of one another, one on the cashier side and one on the customer side with the coin recycler located in the middle of the system between both cash recyclers, and memory storing computer readable instructions that, when executed by the at least one processor, cause the automated till register system by at least one hardware processor in each cash recycler machine comprising a locked cash repository, and a cash dispenser that dispenses cash from the cash repository to
  i. process cashless transactions at the at least one Point of Sale system;
  ii. determine an amount of cash received, via the cash receptacle, for the transaction, validate the received cash, and transmit a cash-payment notification to a point-of-sale (POS) server over at least one network, wherein the cash-payment notification indicates the amount of cash and a transaction identifier that identifies the transaction;
  iii. by at least one hardware processor of the point-of-sale POS server, receive the cash-payment notification from the cash machine over the at least one network, if the amount of cash indicated in the cash-payment notification is sufficient to satisfy payment for the transaction identified in the cash-payment notification, determine whether or not change is due for the transaction, when determining that change is due, transmit a change notification to the cash machine over the at least one network, wherein the change notification indicates an amount of the change due for the transaction, and automatically close the transaction; and
  iv. by the at least one hardware processor of the cash machine, when a change notification is transmitted by the POS server, receive the change notification from the POS server over the at least one network, and dispense the amount of the change that is indicated in the change notification via the cash dispenser.

15. The method of claim 14 further comprising:
a. reconciles cash count from a previous shift;
b. prepares and performs cash count;
c. transmits cash count data to financial institution;
d. records details of each POS transaction during the present shift;
e. calculates tips and tip payouts at the end of each shift;
f. prepares shift report for manager; and
g. notifies secure courier when cash is to be delivered to financial institution.

16. The method of claim 15 further comprising:
a. reconciles inventory with recorded transactions; and
b. communicates with warehouse for delivery of needed items.

17. The method of claim 15 further comprising:
The payment of tips performed as a cash payout at the end of a shift or as an electronic payment at a future time.

18. A method for operating an automated till register system comprising at least one processor, at least one point of sale (POS) system and interface, at least one automated till register system consisting of two cash recyclers and one coin recycler in a twin opposite configuration, said cash recyclers oriented on opposite sides of one another, one on the cashier side and one on the customer side with the coin recycler located in the middle of the system between both cash recyclers, and memory storing computer readable instructions that, when executed by the at least one processor, cause the automated till register system by at least one hardware processor to perform the steps of:
a. entering and allowing transactions at a plurality of point of sale devices;
b. communicating information regarding the transactions from the said point of sale devices to at least one automated till register system, the transactions including cash and non-cash payments;
c. using the information in order to identify an expected count;
d. moving transaction-related materials from the point of sale devices to said at least one automated till register system;
e. counting, by a processor, at least some of said transaction-related materials in order to identify an actual count;
f. comparing, by the processor, the actual count to the expected count;
g. communicating the actual count and the expected count to an accounting system; and
h. networking a plurality of cash and coin recycler devices to act together as a combined unit.

19. The method of claim 18 further comprising:
a. the automated till register system reconciling cash count from a previous shift;
b. the automated till register system preparing cash count and transmits data to financial institution;
c. the automated till register system recording details of each transaction during the present shift;
d. the automated till register system calculating tips and tip payouts at the end of each shift;
e. the automated till register system preparing shift report for manager; and
f. the automated till register system notifying secure courier when cash is to be delivered to financial institution.

20. The method of claim 19 further comprising:
a. the automated till register system reconciling inventory with recorded transactions; and
b. communicating with supplier for delivery of needed items.

* * * * *